United States Patent
Ikarashi et al.

(10) Patent No.: US 7,369,372 B2
(45) Date of Patent: May 6, 2008

(54) EXCHANGE-COUPLED FILM INCLUDING PINNED MAGNETIC LAYER COMPOSED OF A PLURALITY OF COBALT-IRON ALLOYS HAVING DIFFERENT COMPOSITIONS DISPOSED ON ANTIFERROMAGNETIC LAYER, AND MAGNETIC SENSING ELEMENT

(75) Inventors: Kazuaki Ikarashi, Niigata-ken (JP); Naoya Hasegawa, Niigata-ken (JP); Eiji Umetsu, Niigata-ken (JP); Kazumi Matsuzaka, Niigata-ken (JP); Takuya Seino, Tokyo (JP)

(73) Assignee: Alps Electric Co., Ltd, Tokyo (JP)

(*) Notice: Subject to any disclaimer, the term of this patent is extended or adjusted under 35 U.S.C. 154(b) by 385 days.

(21) Appl. No.: 11/271,263

(22) Filed: Nov. 8, 2005

(65) Prior Publication Data
US 2006/0098355 A1 May 11, 2006

(30) Foreign Application Priority Data
Nov. 10, 2004 (JP) ............................. 2004-326565

(51) Int. Cl.
*G11B 5/00* (2006.01)
(52) U.S. Cl. ................................. 360/324.11
(58) Field of Classification Search ... 360/324–342.11, 360/314
See application file for complete search history.

(56) References Cited

U.S. PATENT DOCUMENTS 5,942,309 A * 8/1999 Kamijo ..................... 428/141

7,126,797 B2 * 10/2006 Hasegawa et al. ......... 360/324.1
7,256,972 B2 * 8/2007 Gill ......................... 360/324.12
7,288,281 B2 * 10/2007 Li et al. ..................... 427/127
2007/0120211 A1 * 5/2007 Diao et al. .................. 257/427

FOREIGN PATENT DOCUMENTS

| JP | 9-148132 | | 6/1997 |
|---|---|---|---|
| JP | 09148132 A | * | 6/1997 |
| JP | 9-237716 | | 9/1997 |
| JP | 2002-208120 | | 7/2002 |
| JP | 2004-103806 | | 4/2004 |

* cited by examiner

*Primary Examiner*—Wayne Young
*Assistant Examiner*—Vanessa Coleman
(74) *Attorney, Agent, or Firm*—Brinks Hofer Gilson & Lione

(57) ABSTRACT

An exchange-coupled film includes a ferromagnetic layer and an antiferromagnetic layer disposed on each other, the magnetization direction of the ferromagnetic layer being pinned in one direction by an exchange coupling magnetic field generated at the interface between the ferromagnetic layer and the antiferromagnetic layer, wherein the antiferromagnetic layer is composed of $Ir_z Mn_{100-z}$ (wherein 2 atomic percent $\leq z \leq 80$ atomic percent), the ferromagnetic layer has a two-layer structure including a $Co_y Fe_{100-y}$ layer having a face-centered cubic structure (wherein 80 atomic percent $\leq y \leq 100$ atomic percent), the $Co_y Fe_{100-y}$ layer being in contact with the antiferromagnetic layer, and an $Fe_x Co_{100-x}$ layer (wherein $x \geq 30$ atomic percent), the $Fe_x Co_{100-x}$ layer being disposed on the $Co_y Fe_{100-y}$ layer, and the thickness of the $Fe_x Co_{100-x}$ layer is 30% to 90% of the total thickness of the ferromagnetic layer.

11 Claims, 7 Drawing Sheets

EXCHANGE-COUPLED FILM INCLUDING PINNED MAGNETIC LAYER COMPOSED OF A PLURALITY OF COBALT-IRON ALLOYS HAVING DIFFERENT COMPOSITIONS DISPOSED ON ANTIFERROMAGNETIC LAYER, AND MAGNETIC SENSING ELEMENT

BACKGROUND OF THE INVENTION

1. Field of the Invention

The present invention relates to an exchange-coupled film utilizing exchange coupling between an antiferromagnetic layer and a ferromagnetic layer, and a magnetic sensing element including the exchange-coupled film.

2. Description of the Related Art

FIG. 8 is a sectional view of a magnetic sensing element (spin-valve thin-film element) having a conventional structure. The magnetic sensing element includes a multilayer film M exhibiting a magnetoresistance effect, and hard bias layers 109 and electrode layers 110 disposed at both sides of the multilayer film M. The multilayer film M includes a seed layer 103, an antiferromagnetic layer 104, a pinned magnetic layer 105, a nonmagnetic layer 106, a free magnetic layer 107, and a protective layer 108 disposed in that order from the bottom. The magnetization of the pinned magnetic layer 105 is pinned in the height direction (in the Y direction in the drawing) by an exchange coupling magnetic field generated at the interface between the antiferromagnetic layer 104 and the pinned magnetic layer 105. In general, the antiferromagnetic layer 104 is composed of PtMn or IrMn, and the pinned magnetic layer 105 is composed of CoFe. The hard bias layers 109 are in contact with both sides in the track width direction (in the X direction in the drawing) of the multilayer film M and apply a longitudinal bias magnetic field to the free magnetic layer 107 so that the magnetization of the free magnetic layer 107 is aligned in the track width direction. The electrode layers 110 are conductors that supply a sensing current to the multilayer film M. The sensing current from one of the electrode layers 110 mainly flows through three layers, i.e., the pinned magnetic layer 105, the nonmagnetic layer 106, and the free magnetic layer 107. The magnetic sensing element having such a conventional structure is disclosed in Patent Document 1 (Japanese Unexamined Patent Application Publication No. 9-237716, p. 7, FIG. 10), Patent Document 2 (Japanese Unexamined Patent Application Publication No. 9-148132, p. 8, FIG. 10), or Patent Document 3 (Japanese Unexamined Patent Application Publication No. 2002-208120, p. 11).

Patent Documents 1 to 3 each describe a magnetic sensing element in which an antiferromagnetic layer composed of IrMn and a pinned magnetic layer (ferromagnetic layer) composed of CoFe are disposed on each other. However, with respect to the composition ratio of CoFe, only $Co_{90}Fe_{10}$ is described. When a pinned magnetic layer composed of $Co_{90}Fe_{10}$ and an antiferromagnetic layer composed of PtMn are disposed on each other, the exchange coupling magnetic field produced at the interface between the pinned magnetic layer and the antiferromagnetic layer is sufficiently strong, and the magnetization of the pinned magnetic layer can be strongly pinned. However, when such a pinned magnetic layer and an antiferromagnetic layer composed of IrMn are disposed on each other, the exchange coupling magnetic field produced at the interface between the pinned magnetic field and the antiferromagnetic layer is weak, and there may be a possibility that the magnetization direction of the pinned magnetic layer is reversed during the fabrication process of the magnetic sensing element. In particular, in a top spin-valve magnetic sensing element in which an antiferromagnetic layer is disposed on a pinned magnetic layer, there is a high probability of magnetization reversal of the pinned magnetic layer.

SUMMARY OF THE INVENTION

It is an object of the present invention to provide an exchange-coupled film which can produce a large exchange coupling magnetic field at the interface between an antiferromagnetic layer composed of IrMn and a ferromagnetic layer (pinned magnetic layer) and the magnetization of the ferromagnetic layer can be strongly pinned, and a magnetic sensing element including such an exchange-coupled film.

The present invention is based on the findings that by using a ferromagnetic layer having a two-layer structure including a $Co_yFe_{100-y}$ layer having a face-centered cubic structure and an Fe-rich $Fe_xCo_{100-x}$ layer, it is possible to produce a large exchange coupling magnetic field at the interface with an antiferromagnetic layer composed of IrMn, the magnitude of the exchange coupling magnetic field exceeding that of an exchange coupling magnetic field in the case of $Fe_{30}Co_{70}$ which has been known to be maximum among $Fe_xCo_{100-x}$ alloys, and that by setting the thickness ratio between the $Co_yFe_{100-y}$ layer and the $Fe_xCo_{100-x}$ layer and the Fe content x in the $Fe_xCo_{100-x}$ in optimum ranges, a larger exchange coupling magnetic field can be obtained.

In one aspect of the present invention, an exchange-coupled film includes a ferromagnetic layer and an antiferromagnetic layer disposed on each other, the magnetization direction of the ferromagnetic layer being pinned in one direction by an exchange coupling magnetic field generated at the interface between the ferromagnetic layer and the antiferromagnetic layer, wherein the antiferromagnetic layer is composed of $Ir_zMn_{100-z}$ (wherein 2 atomic percent$\leq z \leq$80 atomic percent), the ferromagnetic layer has a two-layer structure including a $Co_yFe_{100-y}$ layer having a face-centered cubic structure (wherein 80 atomic percent$\leq y \leq$100 atomic percent), the $Co_yFe_{100-y}$ layer being in contact with the antiferromagnetic layer, and an $Fe_xCo_{100-x}$ layer (wherein x$\geq$30 atomic percent), the $Fe_xCo_{100-x}$ layer being disposed on the $Co_yFe_{100-y}$ layer, and the thickness of the $Fe_xCo_{100-x}$ layer is 30% to 90% of the total thickness of the ferromagnetic layer.

In such a construction, the $Co_yFe_{100-y}$ layer having the same crystal structure as that of the IrMn antiferromagnetic layer is disposed at the interface with the IrMn antiferromagnetic layer, and the Fe-rich $Fe_xCo_{200-x}$ layer is disposed on the $Co_yFe_{100-Y}$ layer. Consequently, crystallinity (crystallographic coherence) in the entire ferromagnetic layer can be enhanced, and Fe crystal grains of the $Fe_xCo_{100-x}$ layer are diffused by annealing treatment to produce an Fe-rich state at the interface between the IrMn antiferromagnetic layer and the ferromagnetic layer. As a result, the magnitude of an exchange coupling magnetic field generated at the interface between the IrMn antiferromagnetic layer and the ferromagnetic layer is believed to be increased.

In order to obtain a larger exchange coupling magnetic field, preferably, the Fe content x in the $Fe_xCo_{100-x}$ layer is 60 atomic percent or more, and the thickness of the $Fe_xCo_{100-x}$ layer is 40% to 60% of the total thickness of the ferromagnetic layer.

Preferably, the total thickness of the ferromagnetic layer is 1 nm to 2 nm. More specifically, preferably, the $Fe_xCo_{100-x}$ layer has a thickness of 1 nm or less and has a face-centered cubic structure. Although the original crystal structure of Fe-rich $Fe_xCo_{100-x}$ is a body-centered cubic structure, by depositing (crystal growing) Fe-rich $Fe_xCo_{100-x}$ on the $Co_yFe_{100-y}$ layer having the face-centered cubic structure, if the thickness is small at 1 nm or less, the $Fe_xCo_{100-x}$ can maintain the face-centered cubic structure, the exchange coupling magnetic field between the $Co_yFe_{100-y}$ layer and the IrMn antiferromagnetic layer can be increased without degrading the crystal orientation.

Preferably, the antiferromagnetic layer has a thickness of 30 Å to 80 Å. In this range, an exchange coupling magnetic field between an antiferromagnetic layer composed of an IrMn alloy and a ferromagnetic layer is larger than an exchange coupling magnetic field between an antiferromagnetic layer composed of a PtMn alloy and a ferromagnetic layer. More preferably, the antiferromagnetic layer is composed of $Ir_zMn_{100-z}$ (wherein 10 atomic percent$\leq z$—30 atomic percent) because the antiferromagnetic layer is ensured to have a face-centered cubic structure.

The present invention is applicable to both a top spin-valve magnetic sensing element and a bottom spin-valve magnetic sensing element. That is, in another aspect of the present invention, a magnetic sensing element includes a free magnetic layer, a nonmagnetic layer, a pinned magnetic layer, and an antiferromagnetic layer disposed in that order from the bottom, the magnetization of the free magnetic layer being aligned in a direction substantially perpendicular to the magnetization direction of the pinned magnetic layer, wherein the pinned magnetic layer and the antiferromagnetic layer correspond to an exchange-coupled film according to the present invention. Alternatively, in another aspect of the present invention, a magnetic sensing element includes an antiferromagnetic layer, a pinned magnetic layer, a nonmagnetic layer, and a free magnetic layer disposed in that order from the bottom, the magnetization of the free magnetic layer being aligned in a direction substantially perpendicular to the magnetization direction of the pinned magnetic layer, wherein the pinned magnetic layer and the antiferromagnetic layer correspond to an exchange-coupled film according to the present invention. The pinned magnetic layer may have a laminated ferrimagnetic structure including a first magnetic layer, a second magnetic layer, and a nonmagnetic intermediate layer interposed between the first and second magnetic layers. In the magnetic sensing element including the pinned magnetic layer having the laminated ferrimagnetic structure, preferably, the antiferromagnetic layer and the first magnetic layer in contact with the antiferromagnetic layer correspond to an exchange-coupled film according to the present invention.

The present invention is also applicable to a dual spin-valve magnetic sensing element. That is, in another aspect of the present invention, a magnetic sensing element includes a lower antiferromagnetic layer, a lower pinned magnetic layer, a lower nonmagnetic layer, a free magnetic layer, an upper nonmagnetic layer, an upper pinned magnetic layer, and an upper antiferromagnetic layer disposed in that order from the bottom, the magnetization direction of the free magnetic layer being aligned in a direction substantially perpendicular to the magnetization directions of the upper pinned magnetic layer and the lower pinned magnetic layer, wherein at least one of a combination of the lower antiferromagnetic layer and the lower pinned magnetic layer and a combination of the upper antiferromagnetic layer and the upper pinned magnetic layer corresponds to an exchange-coupled film according to the present invention. At least one of the lower pinned magnetic layer and the upper pinned magnetic layer may have a laminated ferrimagnetic structure including a first magnetic layer, a second magnetic layer, and a nonmagnetic intermediate layer interposed between the first and second magnetic layers. In the magnetic sensing element including the pinned magnetic layer having the laminated ferrimagnetic structure, preferably, the antiferromagnetic layer and the first magnetic layer in contact with the antiferromagnetic layer correspond to an exchange-coupled film according to the present invention.

The present invention provides an exchange-coupled film which can produce a large exchange coupled magnetic field at the interface between an antiferromagnetic layer composed of IrMn and a ferromagnetic layer (pinned magnetic layer) and the magnetization of the ferromagnetic layer can be strongly pinned, and a magnetic sensing element including such an exchange-coupled film.

DESCRIPTION OF THE PREFERRED EMBODIMENTS

Embodiments of the present invention will be described with reference to the drawings. In each drawing, the X direction corresponds to a track width direction, the Y direction corresponds to a direction of a leakage magnetic field from a recording medium, and the Z direction corresponds to a travelling direction of the recording medium as well as to a deposition direction of the individual layers constituting a magnetic sensing element.

Figure 1:
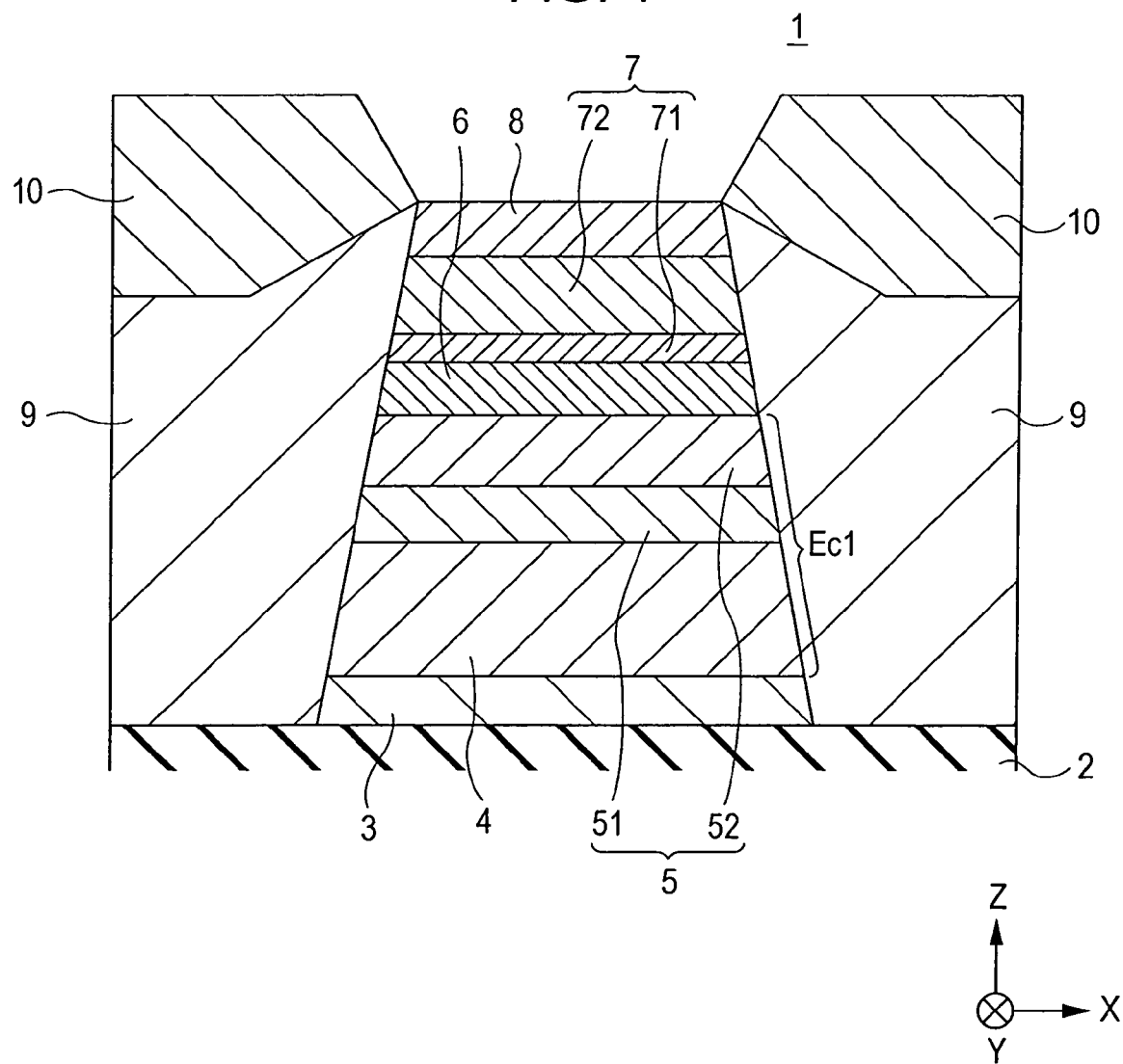
FIG. 1 is a sectional view of a magnetic sensing element (single spin-valve magnetoresistive element) in a first embodiment of the present invention, viewed from a surface facing a recording medium.

FIG. 1 is a schematic sectional view of a magnetic sensing element 1 (single spin-valve giant magnetoresistive element) in a first embodiment of the present invention, viewed from a surface facing a recording medium. The magnetic sensing element 1 is, for example, mounted on a thin-film magnetic head of a hard disk drive to detect a leakage magnetic field from a recording medium utilizing a giant magnetoresistance effect (GMR effect).

The magnetic sensing element 1 is disposed on a lower gap layer 2 composed of an insulating material, such as alumina ($Al_2O_3$), and includes a seed layer 3, an antiferromagnetic layer 4, a pinned magnetic layer 5, a nonmagnetic layer 6, a free magnetic layer 7, and a protective layer 8 disposed in that order on the lower gap layer 2. Although not shown in the drawing, below the lower gap layer 2, an insulating layer composed of alumina or the like, an underlayer composed of Ta or the like, a seed layer composed of a NiFe alloy or the like, and a lower shielding layer composed of a NiFe alloy or the like disposed in that order on an AlTiC substrate.

The seed layer 3 is an underlayer which adjusts the crystal growth of the antiferromagnetic layer 4 and the layers above the antiferromagnetic layer 4 and which is composed of a NiFeCr alloy, a NiCr alloy, Cr, or the like. An underlayer composed of a nonmagnetic material containing at least one element selected from Ta, Hf, Nb, Zr, Ti, Mo, and W may be provided between the seed layer 3 and the lower gap layer 2, and the underlayer may be disposed instead of the seed layer 3.

The antiferromagnetic layer 4 produces a large exchange coupling magnetic field at the interface with the pinned magnetic layer 5 when subjected to annealing treatment, and pins the magnetization direction of the pinned magnetic layer 5 in the Y direction. The antiferromagnetic layer 4 is composed of an $Ir_zMn_{100-z}$ alloy (wherein 2 atomic percent$\leq z \leq$80 atomic percent, more preferably 10 atomic percent$\leq z \leq$30 atomic percent) which has a face-centered cubic crystal structure, and has a small thickness of 30 Å to 80 Å. In this thickness range, the magnitude of an exchange coupling magnetic field between an antiferromagnetic layer composed of the IrMn alloy and a ferromagnetic layer is larger than an exchange coupling magnetic field between an antiferromagnetic layer composed of a PtMn alloy and a ferromagnetic layer. The IrMn alloy has excellent characteristics as an antiferromagnetic material, for example, a relatively high blocking temperature, a small percentage of low-temperature component of the blocking temperature, and capability of increasing an exchange coupling magnetic field (Hex).

The nonmagnetic layer 6 prevents magnetic coupling between the pinned magnetic layer 5 and the free magnetic layer 7 and is a layer through which a sensing current mainly flows. The nonmagnetic layer 6 can be composed of a conductive nonmagnetic material, such as Cu, Cr, Au, or Ag, and is particularly preferably composed of Cu.

The free magnetic layer 7 includes a CoFe layer 71 and a NiFe alloy layer 72. If the free magnetic layer 7 includes the CoFe layer 71 at the side in contact with the nonmagnetic layer 6, the rate of change in resistance (ΔR/R) can be increased. The CoFe layer 71 is, for example, formed with 90 atomic percent of Co and 10 atomic percent of Fe, at a thickness of about 10 Å. The NiFe alloy layer 72 is, for example, formed with 80 atomic percent of Ni and 20 atomic percent of Fe, at a thickness of about 50 Å. If the Fe content in the CoFe layer 7a exceeds 20 atomic percent, the crystal structure of the CoFe layer 71 becomes a body-centered cubic structure, resulting in degradation in crystal orientation of the multilayer film. Consequently, the Fe content is preferably 0 atomic percent to 20 atomic percent. The free magnetic layer 7 may be composed of a Co alloy, a CoFeNi alloy, or the like, instead of the CoFe layer 71 and the NiFe alloy layer 72. Alternatively, the free magnetic layer 7 may have a one-layer structure composed of a CoFeNi alloy, or a laminated ferrimagnetic structure in which a nonmagnetic layer is interposed between magnetic layers.

The protective layer 8 is composed of Ta or the like. Hard bias layers 9 and electrode layers 10 are disposed at both sides of the multilayer film including the seed layer 3 to the protective layer 8. The hard bias layers 9 are composed of a Co—Pt alloy, a Co—Cr—Pt alloy, or the like, and apply a longitudinal bias magnetic field to the free magnetic layer 7 so that the magnetization of the free magnetic layer 7 is aligned in the track width direction. The electrode layers 10 are composed of α-Ta, Au, Ru, Cr, Cu, W, or the like.

In the magnetic sensing element 1 having the schematic structure described above, the antiferromagnetic layer 4 and the pinned magnetic layer 5 constitute an exchange-coupled film Ec1 utilizing exchange coupling generated at the interface between the antiferromagnetic layer 4 and the pinned magnetic layer 5. This embodiment is characterized by the construction (composition and thickness) of the pinned magnetic layer 5, and the pinned magnetic layer 5 will be described in detail below.

The pinned magnetic layer 5 has a thickness of 1 nm to 2 nm, and has a two-layer structure including a $Co_yFe_{100-y}$ layer 51 (wherein 80 atomic percent$\leq y \leq$100 atomic percent) in contact with the antiferromagnetic layer 4 and an Fe-rich $Fe_xCo_{100-x}$ layer 52 (wherein x$\geq$30 atomic percent) disposed on the $Co_yFe_{100-y}$ layer 51.

The $Co_yFe_{100-y}$ layer 51 has a face-centered cubic structure that is the same as that of the antiferromagnetic layer 4 composed of $Ir_zMn_{100-z}$ (wherein 2 atomic percent$\leq z \leq$80 atomic percent, preferably 10 atomic percent$\leq z \leq$30 atomic percent), and good crystalline coherence is shown at the interface with the antiferromagnetic layer 4. If the Fe content exceeds 20 atomic percent, the crystal structure of the $Co_yFe_{100-y}$ layer 51 becomes a body-centered cubic structure. Consequently, the Co content y is specified to satisfy 80 atomic percent$\leq y \leq$100 atomic percent.

The $Fe_xCo_{100-x}$ layer 52 has a thickness of 1 nm or less and maintains the face-centered cubic structure of the $Co_yFe_{100-y}$ layer 51. Although the original crystal structure of the Fe-rich $Fe_xCo_{100-x}$ layer is a body-centered cubic structure, by depositing Fe-rich $Fe_xCo_{100-x}$ at a small thickness of 1 nm or less on the $Co_yFe_{100-y}$ layer 51 having the face-centered cubic structure as in this embodiment, crystal growth with a body-centered cubic structure does not occur, and the face-centered cubic structure can be maintained. Thus, the crystal orientation is not degraded.

Figure 2:
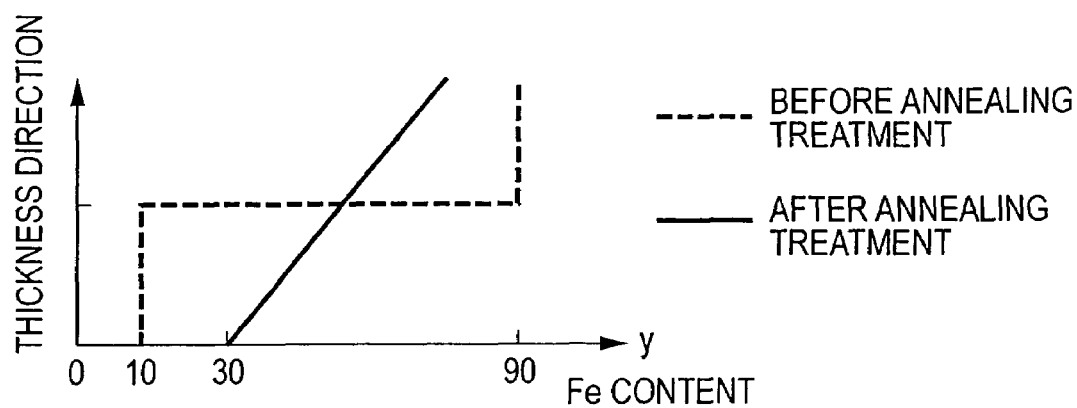
FIG. 2 is a graph showing a change in the Fe content of a pinned magnetic layer before and after annealing treatment.

The pinned magnetic layer 5 is subjected to annealing treatment (annealing treatment to produce an exchange coupling magnetic field at the interface with the antiferromagnetic layer 4) after the $Co_yFe_{100-y}$ layer 51 and the $Fe_xCo_{100-x}$ layer 52 are deposited. FIG. 2 is a graph showing the Fe contents of the pinned magnetic layer 5 measured before and after annealing treatment. The vertical axis indicates the thickness direction of the pinned magnetic layer 5, and the horizontal axis indicates the Fe content (at %) of the pinned magnetic layer 5. With respect to the Fe content of the pinned magnetic layer 5 before annealing treatment, as shown by the chain line in FIG. 2, the Fe content is discontinuous at the interface between the $Co_yFe_{100-y}$ layer 51 with the Co content being set at 90 atomic percent and the $Fe_xCo_{100-x}$ layer 52. The Fe content of the $Co_yFe_{100-y}$ layer 51 is constant at 10 atomic percent, and the Fe content of the $Fe_xCo_{100-x}$ layer 52 is constant at x ($x \geq 30$ atomic percent). In contrast, after annealing treatment, because of thermal diffusion of Fe grains of the $Fe_xCo_{100-x}$ layer 52, the difference in the Fe content between the $Co_yFe_{100-y}$ layer 51 and the $Fe_xCo_{100-x}$ layer 52 is reduced (i.e., the Fe content of the $Fe_xCo_{100-x}$ layer 52 is decreased and the Fe content of the $Co_yFe_{100-y}$ layer 51 is increased). As shown by the solid line in FIG. 2, the Fe content of the pinned magnetic layer 5 gradually increases from the interface with the antiferromagnetic layer 4 in the thickness direction. Furthermore, the Fe content of the pinned magnetic layer 5 exceeds 30 atomic percent at the interface with the antiferromagnetic layer 4, and the chemical composition at the interface is in an Fe-rich state.

Figure 3:
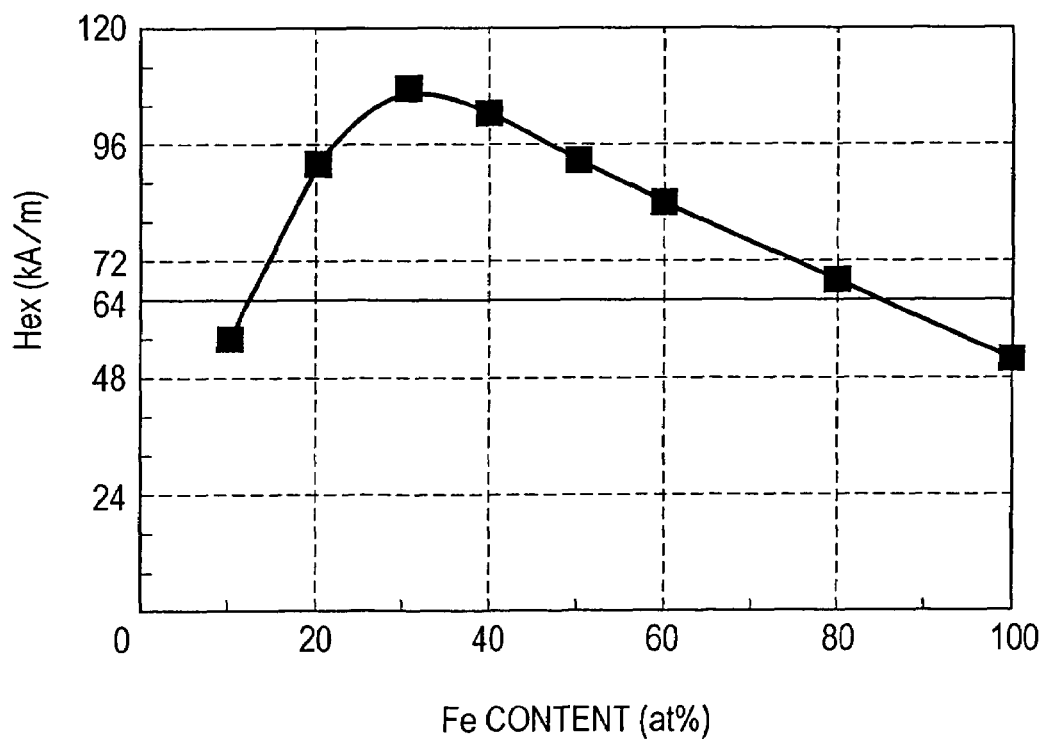
FIG. 3 is a graph showing a relationship between the Fe content of a pinned magnetic layer including a single CoFe layer and the magnitude of an exchange coupling magnetic field generated between an IrMn antiferromagnetic layer and the pinned magnetic layer.

The present inventors have found that the magnitude of the exchange coupling magnetic field between an IrMn antiferromagnetic layer and a pinned magnetic layer composed of $Co_yFe_{100-y}$ is maximum when the Fe content of $Fe_xCo_{100-x}$ is 30 atomic percent (i.e., the pinned magnetic layer is composed of $Fe_{30}Co_{70}$) (refer to FIG. 3) and have proposed that the composition of at least an interface portion of a pinned magnetic layer, the interface portion being in contact with an IrMn antiferromagnetic layer, is set to be $Fe_zCo_{100-z}$ (wherein 30 atomic percent$\leq z \leq$90 atomic percent) in Japanese Patent Application No. 2004-206889. However, it has been found that by using the pinned magnetic layer 5 having the two-layer structure including the $Co_yFe_{100-y}$ layer 51 and the $Fe_xCo_{100-x}$ layer 52 (wherein $x \geq 30$ atomic percent), it is possible to obtain an exchange coupling magnetic field that is larger than that obtained in the case in which a pinned magnetic layer including an $Fe_{30}Co_{70}$ single layer is used. In the pinned magnetic layer 5, each of the thickness of the $Fe_xCo_{100-x}$ layer 52 (wherein $x \geq 30$ atomic percent) and the Fe content x of the $Fe_xCo_{100-x}$ layer 52 has an optimum range in which a larger exchange coupling magnetic field can be obtained compared with a pinned magnetic layer including an $Fe_{30}Co_{70}$ single layer.

Figure 4:
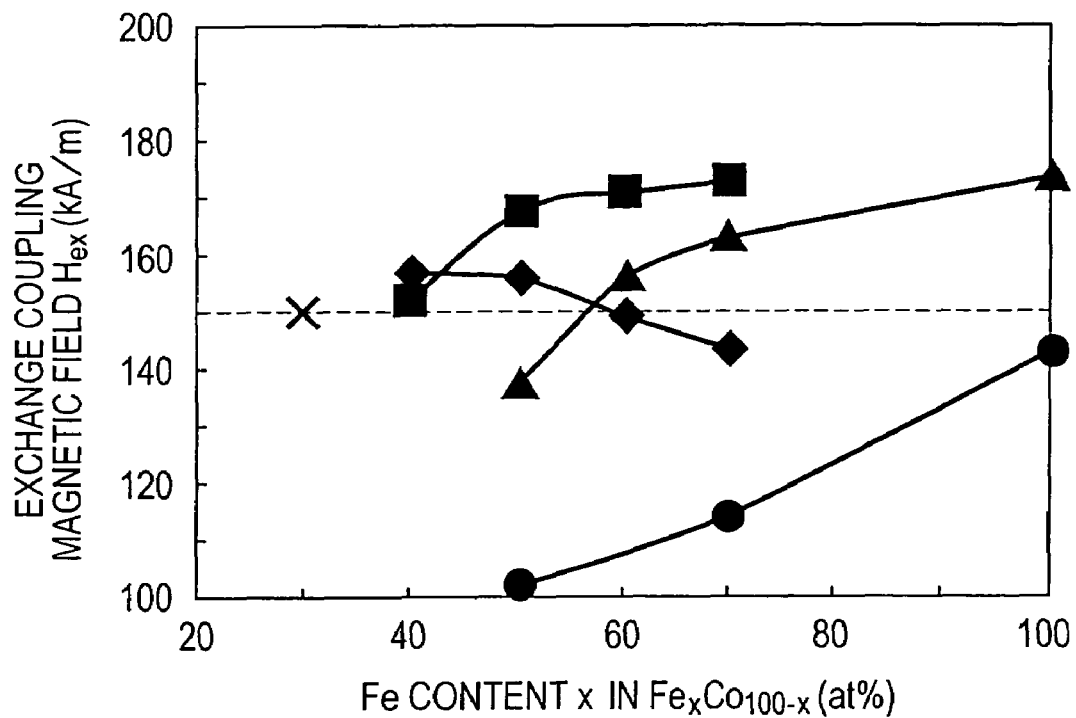
FIG. 4 is a graph showing a relationship between the Fe content in each $Fe_xCo_{100-x}$ layer and the magnitude of an exchange coupling magnetic field generated between an IrMn antiferromagnetic layer and a pinned magnetic layer shown in FIG. 1, the thickness ratio between a $Co_{90}Fe_{10}$ layer ($Co_yFe_{100-y}$ layer) and an $Fe_xCo_{100-x}$ layer being varied.

FIG. 4 is a graph showing a relationship between the Fe content x in the $Fe_xCo_{100-x}$ layer 52 and the magnitude of an exchange coupling magnetic field generated at the interface with the antiferromagnetic layer 4 with respect to samples S1 to S4 with the thickness ratio between the $Co_yFe_{100-y}$ layer 51 and the $Fe_xCo_{100-x}$ layer 52 being varied. In the graph, a filled dot indicates sample S1, a filled triangle indicates sample S2, a filled square indicates sample S3, and a filled diamond indicates sample S4. Symbol × indicates a magnitude of the exchange coupling magnetic field Hex generated between the antiferromagnetic layer 4 and a pinned magnetic layer (1.3 nm) including an $Fe_{30}Co_{70}$ single layer. Note that in each of samples S1 to S4, the $Co_yFe_{100-y}$ layer 51 is a $Co_{90}Fe_{10}$ layer in which the Co content y is set at a certain value (y=90 atomic percent).

The thickness ratio between the $Co_{90}Fe_{10}$ layer 51 and the $Fe_xCo_{100-x}$ layer 52 in each of samples S1 to S4 is shown in Table 1 below. The total thickness of the pinned magnetic layer 5 is set at a certain value (1.3 nm).

TABLE 1

| S1: | $Co_{90}Fe_{10}$ layer (1.0 nm)/$Fe_xCo_{100-x}$ layer (0.3 nm) |
| --- | --- |
| S2: | $Co_{90}Fe_{10}$ layer (0.8 nm)/$Fe_xCo_{100-x}$ layer (0.5 nm) |
| S3: | $Co_{90}Fe_{10}$ layer (0.6 nm)/$Fe_xCo_{100-x}$ layer (0.7 nm) |
| S4: | $Co_{90}Fe_{10}$ layer (0.3 nm)/$Fe_xCo_{100-x}$ layer (1.0 nm) |

Figure 5:
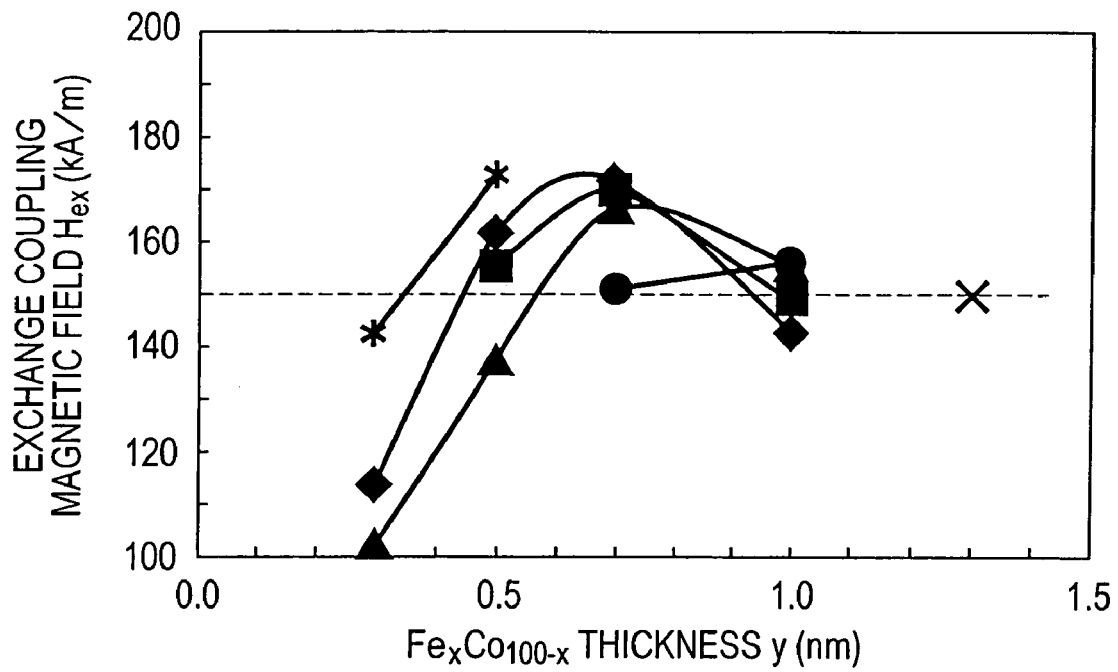
FIG. 5 is a graph showing a relationship between the thickness of each $Fe_xCo_{100-x}$ layer and the magnitude of an exchange coupling magnetic field generated between an IrMn antiferromagnetic layer and a pinned magnetic layer shown in FIG. 1, the Fe content of the $Fe_xCo_{100-x}$ layer being varied.

FIG. 5 is a graph showing a relationship between the thickness of each $Fe_xCo_{100-x}$ layer 52 and the magnitude of an exchange coupling magnetic field generated between the pinned magnetic layer and the antiferromagnetic layer 4, the Fe content x of the $Fe_xCo_{100-x}$ layer 52 being varied. In the graph, a filled dot indicates sample S5, a filled triangle indicates sample S6, a filled square indicates sample S7, and a filled diamond indicates sample S8. Asterisk indicates sample S9, and symbol × indicates a magnitude of the exchange coupling magnetic field Hex generated between the antiferromagnetic layer 4 and a pinned magnetic layer (1.3 nm) including an $Fe_{30}Co_{70}$ single layer. Note that in each of samples S5 to S9, the $Co_yFe_{100-y}$ layer 51 is a $Co_{90}Fe_{10}$ layer in which the Co content y is set at a certain value (y=90 atomic percent).

The Fe content x in each of samples S5 to S9 is shown in Table 2 below. The total thickness of the pinned magnetic layer 5 is set at a certain value (1.3 nm).

TABLE 2

| S5: | $Co_{90}Fe_{10}$ layer/$Fe_{40}Co_{60}$ layer |
| --- | --- |
| S6: | $Co_{90}Fe_{10}$ layer/$Fe_{50}Co_{50}$ layer |
| S7: | $Co_{90}Fe_{10}$ layer/$Fe_{60}Co_{40}$ layer |
| S8: | $Co_{90}Fe_{10}$ layer/$Fe_{70}Co_{30}$ layer |
| S9: | $Co_{90}Fe_{10}$ layer/Fe layer |

As is evident from FIGS. 4 and 5, when the $Co_yFe_{100-y}$ layer 51 is thick and the $Fe_xCo_{100-x}$ layer 52 is thin, the magnitude of the resulting exchange coupling magnetic field increases as the Fe content x of the $Fe_xCo_{100-x}$ layer 52 increases. In contrast, when the $Co_yFe_{100-y}$ layer 51 is thin and the $Fe_xCo_{100-x}$ layer 52 is thick, the magnitude of the resulting exchange coupling magnetic field increases as the Fe content x of the $Fe_xCo_{100-x}$ layer 52 decreases. In view of this, with respect to the pinned magnetic layer 5, if the Fe content x of the $Fe_xCo_{100-x}$ layer 52 is 30 atomic percent or more and the thickness of the $Fe_xCo_{100-x}$ layer 52 is 30% to 90% of the total thickness of the pinned magnetic layer 5, it is possible to produce an exchange coupling magnetic field Hex that is equal to or larger than the exchange coupling magnetic field produced when a $Fe_{30}Co_{70}$ single layer is used as the pinned magnetic layer, at the interface with the antiferromagnetic layer 4.

Furthermore, if the Fe content x of the $Fe_xCo_{100-x}$ layer 52 is set at 60 atomic percent or more and the thickness of the $Fe_xCo_{100-x}$ layer 52 is set at 40% to 60% of the total thickness of the pinned magnetic layer 5 (in FIG. 5, the thickness of the $Fe_xCo_{100-x}$ layer 52 is 0.5 to 0.8 nm), it is possible to produce to an exchange coupling magnetic field that is larger than the exchange coupling magnetic field produced when a $Fe_{30}Co_{70}$ single layer is used as the pinned magnetic layer, at the interface with the antiferromagnetic layer 4.

For example, in sample S3 ($Co_{90}Fe_{10}$ layer (0.6 nm)/$Fe_xCo_{100-x}$ layer (0.7 nm)) shown in FIG. 4, when the Fe content x is set at 70 atomic percent, the magnitude of the exchange coupling magnetic field produced between the antiferromagnetic layer 4 and the pinned magnetic layer 5 is 170 kA/m, which is greatly larger than the exchange coupling magnetic field (150 kA/m) produced between the antiferromagnetic layer 4 and a pinned magnetic layer including an $Fe_{30}Co_{70}$ single layer.

The reason for the increase in the exchange coupling magnetic field generated between the antiferromagnetic layer 4 and the pinned magnetic layer 5 is believed that since $Co_yFe_{100-y}$ having the same crystal structure as that of the antiferromagnetic layer 4 is disposed at the interface with the antiferromagnetic layer 4 and Fe-rich $Fe_xCo_{100-x}$ is disposed on the $Co_yFe_{100-y}$ layer, crystallinity (crystallographic coherence) in the entire ferromagnetic layer 5 is enhanced and also Fe crystal grains of the $Fe_xCo_{100-x}$ layer 52 are diffused by annealing treatment to produce an Fe-rich chemical composition at the interface between the antiferromagnetic layer 4 and the pinned magnetic layer 5. If a large exchange coupling magnetic field is produced between the antiferromagnetic layer 4 and the pinned magnetic layer 5, the magnetization of the pinned magnetic layer 5 is strongly pinned in one direction by the exchange coupling magnetic field, thus preventing magnetization reversal of the pinned magnetic layer 5.

Figure 6:
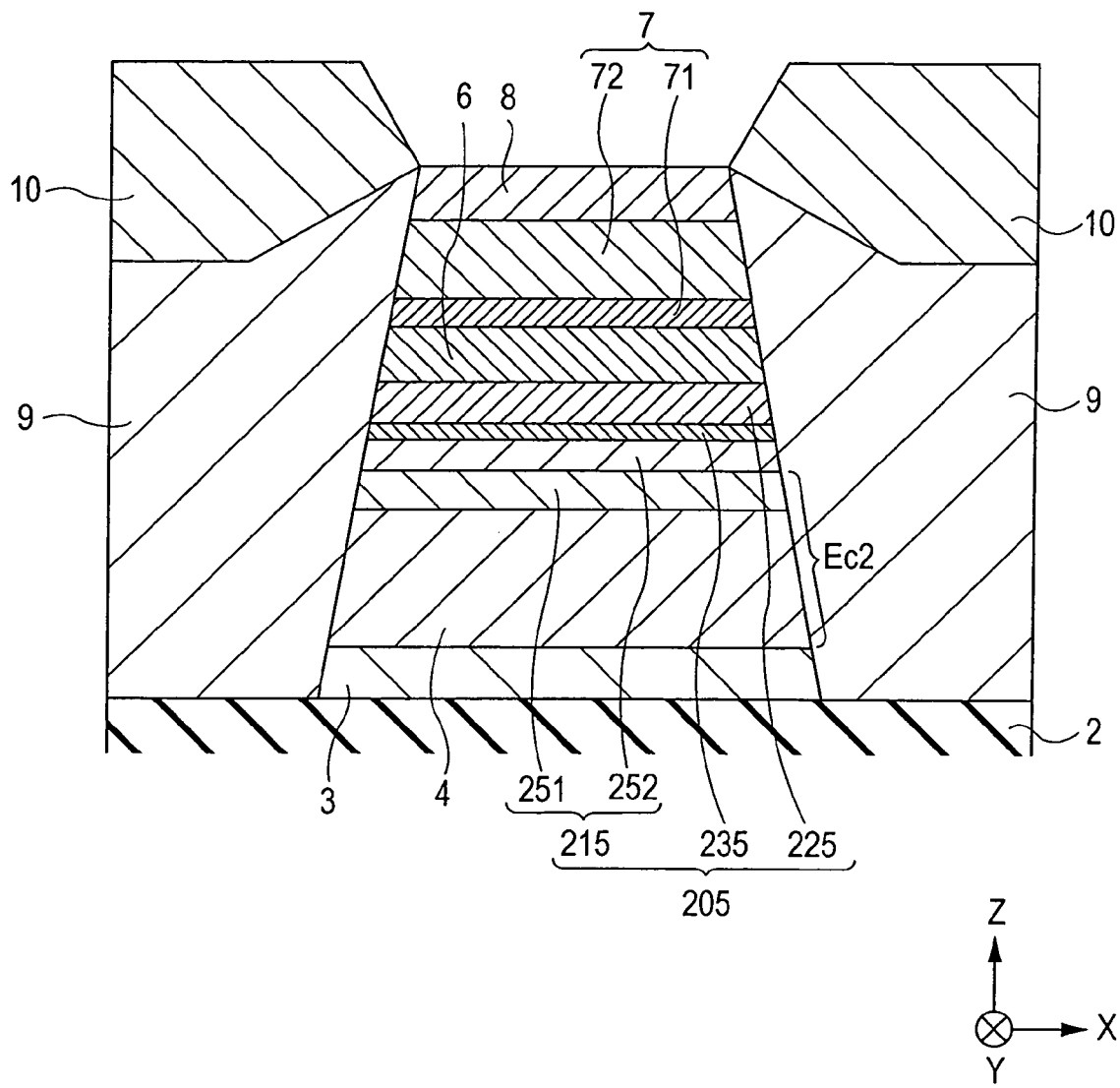
FIG. 6 is a sectional view of a magnetic sensing element (single spin-valve magnetoresistive element) in a second embodiment of the present invention, viewed from a surface facing a recording medium.

FIG. 6 is a schematic sectional view of a magnetic sensing element 201 (single spin-valve giant magnetoresistive element) in a second embodiment of the present invention, viewed from a surface facing a recording medium. The magnetic sensing element 201 includes a pinned magnetic layer 205 having a laminated ferrimagnetic structure including a first magnetic layer 215, a second magnetic layer 225, and a nonmagnetic intermediate layer 235 interposed between the first magnetic layer 215 and the second magnetic layer 225. The first magnetic layer 215 and an antiferromagnetic layer 4 constitute an exchange-coupled film Ec2. Except for the pinned magnetic layer 205 having the laminated ferrimagnetic structure, the second embodiment has the same construction as that of the first embodiment. In FIG. 6, the same components as those in the first embodiment are represented by the same reference numerals as those in FIG. 1.

The first magnetic layer 215 has a thickness of 1 nm to 2 nm and has a two-layer structure including a $Co_yFe_{100-y}$ layer 251 (wherein 80 atomic percent $\leq y \leq 100$ atomic percent) in contact with the antiferromagnetic layer 4 and an Fe-rich $Fe_xCo_{100-x}$ layer 252 (wherein $x \geq 30$ atomic percent) disposed on the $Co_yFe_{100-y}$ layer 251.

The $Co_yFe_{100-y}$ layer 251 has a face-centered cubic structure that is the same as that of the antiferromagnetic layer 4 composed of $Ir_zMn_{100-z}$ (wherein 2 atomic percent $\leq z \leq 80$ atomic percent), and good crystalline coherence is shown at the interface with the antiferromagnetic layer 4. If the Fe content exceeds 20 atomic percent, the crystal structure of the $Co_yFe_{100-y}$ layer 251 becomes a body-centered cubic structure. Consequently, the Co content y is specified to satisfy 80 atomic percent $\leq y \leq 100$ atomic percent.

The $Fe_xCo_{100-x}$ layer 252 has a thickness of 1 nm or less and maintains the face-centered cubic structure of the $Co_yFe_{100-y}$ layer 251. Although the original crystal structure of the Fe-rich $Fe_xCo_{100-x}$ layer is a body-centered cubic structure, by depositing Fe-rich $Fe_xCo_{100-x}$ at a small thickness of 1 nm or less on the $Co_yFe_{100-y}$ layer 251 having the face-centered cubic structure as in this embodiment, crystal growth with a body-centered cubic structure does not occur, and the face-centered cubic structure can be maintained. Thus, the crystal orientation is not degraded.

Furthermore, the first magnetic layer 215 is subjected to annealing treatment after the $Co_yFe_{100-y}$ layer 251 and the $Fe_xCo_{100-x}$ layer 252 are deposited. The elemental Fe in the $Fe_xCo_{100-x}$ layer 252 is diffused by the annealing treatment and the chemical composition at the interface between the first magnetic layer 215 and the antiferromagnetic layer 4 is in an Fe-rich state (Fe content of 30 atomic percent or more).

With respect to the first magnetic layer 215, if the Fe content x of the $Fe_xCo_{100-x}$ layer 252 is 30 atomic percent or more and the thickness of the $Fe_xCo_{100-x}$ layer 252 is 30% to 90% of the total thickness of the first magnetic layer 215, it is possible to produce an exchange coupling magnetic field Hex that is equal to or larger than the exchange coupling magnetic field produced when a $Fe_{30}Co_{70}$ single layer is used as the pinned magnetic layer, at the interface with the antiferromagnetic layer 4. Furthermore, if the Fe content x of the $Fe_xCo_{100-x}$ layer 252 is set at 60 atomic percent or more and the thickness of the $Fe_xCo_{100-x}$ layer 252 is set at 40% to 60% of the total thickness of the first magnetic layer 215, it is possible to produce to an exchange coupling magnetic field that is larger than the exchange coupling magnetic field produced when a $Fe_{30}Co_{70}$ single layer is used as the pinned magnetic layer, at the interface with the antiferromagnetic layer 4. If a large exchange coupling magnetic field is produced between the first magnetic layer 215 and the antiferromagnetic layer 4 in such a manner, the magnetization of the first magnetic layer 215 is strongly pinned, and the magnetization of the second magnetic layer 225 is also strongly pinned through the nonmagnetic intermediate layer 235, thus preventing magnetization reversal of the pinned magnetic layer 205.

In the pinned magnetic layer 205 having the laminated ferrimagnetic structure including the first magnetic layer 215, the magnetizations of the first magnetic layer 215 and the second magnetic layer 225 are antiparallel to each other due to an RKKY interaction generated between the first magnetic layer 215 and the second magnetic layer 225 via the nonmagnetic intermediate layer 235. The second magnetic layer 225 can be composed of a magnetic material, such as a CoFe alloy, Co, or a NiFe alloy, and in this embodiment, the second magnetic layer 225 is composed of a CoFe alloy. If the CoFe alloy is used, the coupling magnetic field in the RKKY interaction generated between the second magnetic layer 225 and the first magnetic layer 215 can be increased, and the magnetization of the second magnetic layer 225 can be properly pinned. The magnetic moment per unit area (saturation magnetization×thickness) of the second magnetic layer 225 is different from the magnetic moment per unit area of the first magnetic layer 215. The nonmagnetic intermediate layer 235 can be composed of one of Ru, Rh, Ir, Os, Cr, Re, and Cu, or an alloy of two or more of these, and in this embodiment, the nonmagnetic intermediate layer 235 is composed of Ru. If Ru is used, the coupling magnetic field in the RKKY interaction generated between the first magnetic layer 215 and the second magnetic layer 225 can be increased, and the magnetizations of the first magnetic layer 215 and the second magnetic layer 225 can be properly set in an antiparallel state. By employing such a laminated ferrimagnetic structure, by the synergistic effect of antiparallel coupling generated between the first magnetic layer 215 and the second magnetic layer 225 via the nonmagnetic intermediate layer 235 and exchange coupling generated between the antiferromagnetic layer 4 and the first magnetic layer 215, the magnetization direction of the pinned magnetic layer 205 can be more stably pinned.

Both the magnetic sensing elements 1 and 201 in the first and second embodiments are bottom spin-valve magnetic sensing elements. The present invention is also applicable to a top spin-valve magnetic sensing element.

Figure 7:
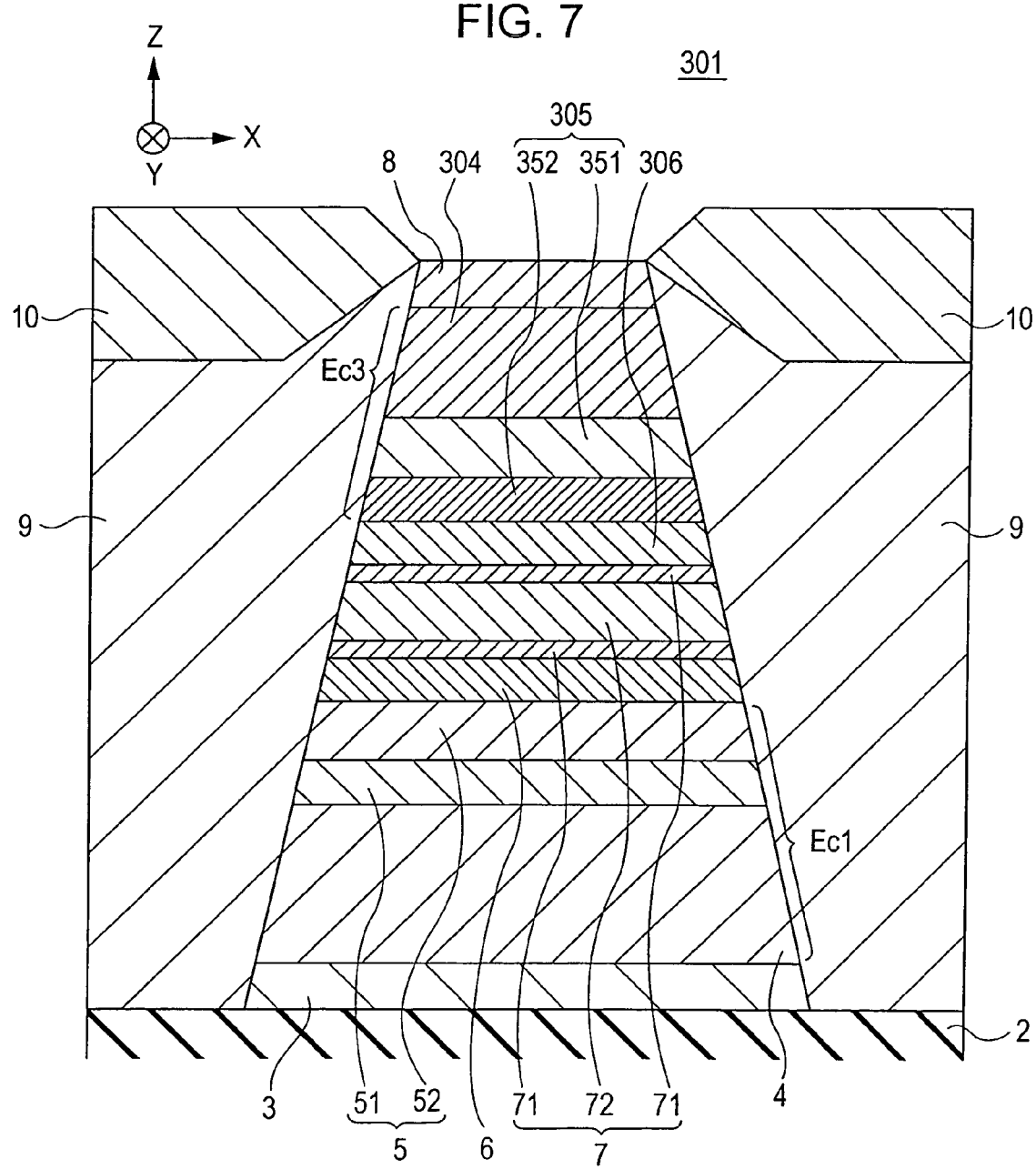
FIG. 7 is a sectional view of a magnetic sensing element (dual spin-valve magnetoresistive element) in a third embodiment of the present invention, viewed from a surface facing a recording medium.
Figure 8:
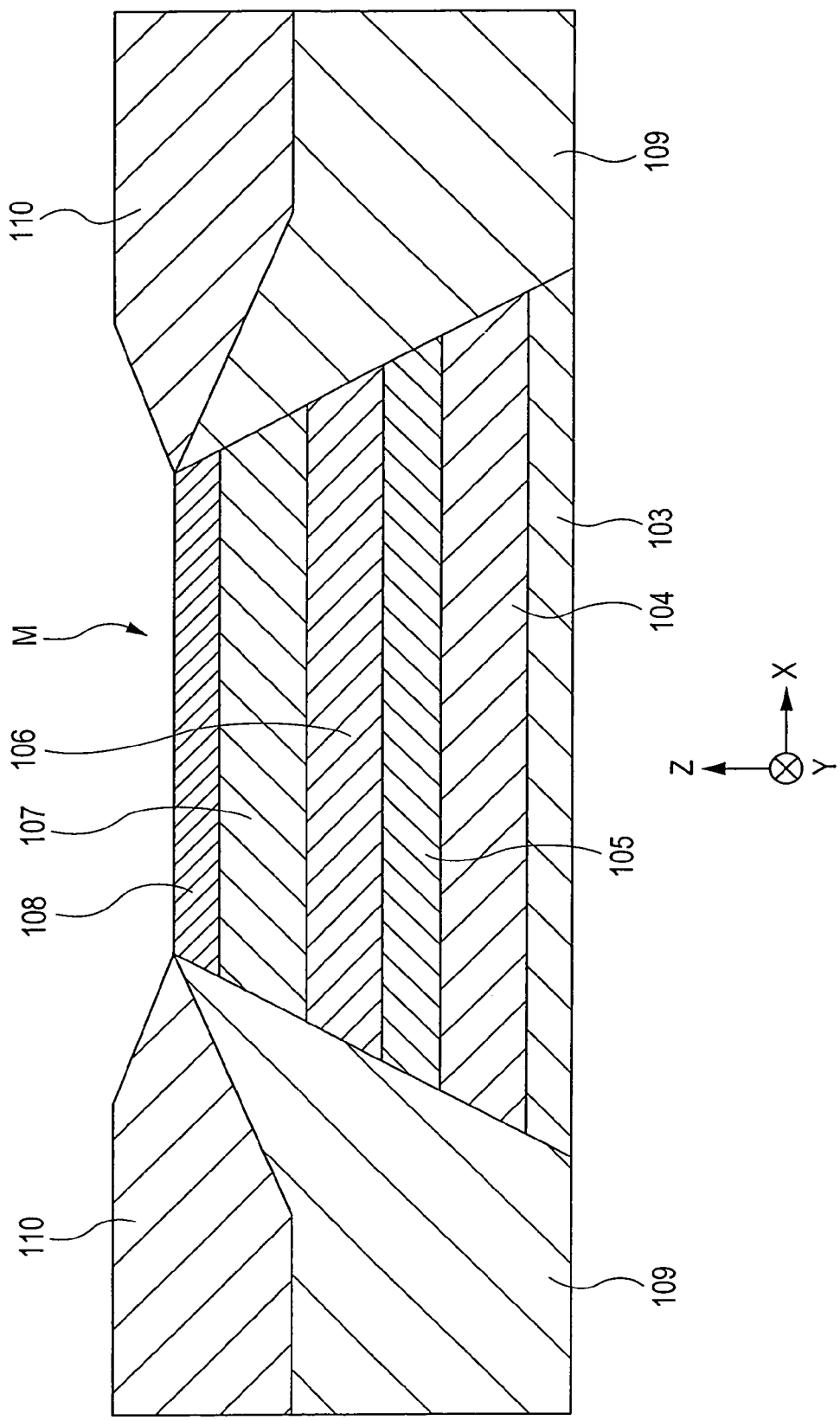
FIG. 8 is a sectional view of a magnetic sensing element (single spin-valve magnetoresistive element) having a conventional structure.

FIG. 7 is a schematic sectional view of a magnetic sensing element 301 (dual spin-valve giant magnetoresistive element) in a third embodiment of the present invention, viewed from a surface facing a recording medium. The magnetic sensing element 301 includes a seed layer 3, an antiferromagnetic layer (lower antiferromagnetic layer) 4, a pinned magnetic layer (lower pinned magnetic layer) 5, a nonmagnetic layer (lower nonmagnetic layer) 6, a free magnetic layer 7, an upper nonmagnetic layer 306, an upper pinned magnetic layer 305, an upper antiferromagnetic layer 304, and a protective layer 8 disposed in that order on a lower gap layer 2. The free magnetic layer 7 includes a CoFe layer 71 and a NiFe alloy layer 72. The structure of the free magnetic layer 7 and the structure other than the inclusion of the upper nonmagnetic layer 306, the upper pinned magnetic layer 305, and the upper antiferromagnetic layer 304 are the same as those in the first embodiment. In FIG. 7, the same components as those in the first embodiment are represented by the same reference numerals as those in FIG. 1.

In the magnetic sensing element 301, the lower antiferromagnetic layer 4 and the lower pinned magnetic layer 5 constitute an exchange-coupled film Ec1, and the upper pinned magnetic layer 305 and the upper antiferromagnetic layer 304 constitute an exchange-exchange coupled film Ec3. The exchange-coupled film Ec1 including the lower antiferromagnetic layer 4 and the lower pinned magnetic layer 5 is the same exchange-coupled film Ec1 described in the first embodiment.

The upper antiferromagnetic layer 304 produces a large exchange coupling magnetic field at the interface with the upper pinned magnetic layer 305 when subjected to annealing treatment, and pins the magnetization direction of the upper pinned magnetic layer 305 in the Y direction. The upper antiferromagnetic layer 304 is, as in the lower antiferromagnetic layer 4, composed of an $Ir_zMn_{100-z}$ alloy (wherein 2 atomic percent≦z≦80 atomic percent, more preferably 10 atomic percent≦z≦30 atomic percent) which has a face-centered cubic crystal structure, and has a small thickness of 30 Å to 80 Å. In this thickness range, the magnitude of an exchange coupling magnetic field between an antiferromagnetic layer composed of the IrMn alloy and a ferromagnetic layer is larger than an exchange coupling magnetic field between an antiferromagnetic layer composed of a PtMn alloy and a ferromagnetic layer. The IrMn alloy has excellent characteristics as an antiferromagnetic material, for example, a relatively high blocking temperature, a small percentage of low-temperature component of the blocking temperature, and capability of increasing an exchange coupling magnetic field (Hex).

The upper nonmagnetic layer 306 can be composed of a conductive nonmagnetic material, such as Cu, Cr, Au, or Ag, and is particularly preferably composed of Cu.

The upper pinned magnetic layer 305 has a thickness of 1 nm to 2 nm, and has a two-layer structure including a $Co_yFe_{100-y}$ layer 351 (wherein 80 atomic percent≦y≦100 atomic percent) in contact with the upper antiferromagnetic layer 304 and an Fe-rich $Fe_xCo_{100-x}$ layer 352 (wherein x≧30 atomic percent) in contact with the $Co_yFe_{100-y}$ layer 351.

The $Co_yFe_{100-y}$ layer 351 has a face-centered cubic structure that is the same as that of the upper antiferromagnetic layer 304 composed of $Ir_zMn_{100-z}$ (wherein 2 atomic percent≦z≦80 atomic percent, preferably 10 atomic percent≦z≦30 atomic percent), and good crystalline coherence is shown at the interface with the antiferromagnetic layer 304. If the Fe content exceeds 20 atomic percent, the crystal structure of the $Co_yFe_{100-y}$ layer 351 becomes a body-centered cubic structure. Consequently, the Co content y is specified to satisfy 80 atomic percent≦y≦100 atomic percent.

The $Fe_xCo_{100-x}$ layer 352 has a thickness of 1 nm or less and maintains the face-centered cubic structure of the upper nonmagnetic layer 306 and below. Although the original crystal structure of the Fe-rich $Fe_xCo_{100-x}$ layer is a body-centered cubic structure, by depositing Fe-rich $Fe_xCo_{100-x}$ at a small thickness of 1 nm or less on the upper nonmagnetic layer 306 and below having the face-centered cubic structure as in this embodiment, crystal growth with a body-centered cubic structure does not occur, and the face-centered cubic structure can be maintained. Thus, the crystal orientation is not degraded.

Furthermore, the upper pinned magnetic layer 305 is subjected to annealing treatment after the $Co_yFe_{100-y}$ layer 351 and the $Fe_xCo_{100-x}$ layer 352 are deposited. The elemental Fe in the $Fe_xCo_{100-x}$ layer 352 is diffused by the annealing treatment and the chemical composition at the interface between the upper pinned magnetic layer 305 and the upper antiferromagnetic layer 304 is in an Fe-rich state (Fe content of 30 atomic percent or more).

With respect to the upper pinned magnetic layer 305, if the Fe content x of the $Fe_xCo_{100-x}$ layer 352 is 30 atomic percent or more and the thickness of the $Fe_xCo_{100-x}$ layer 352 is 30% to 90% of the total thickness of the upper pinned magnetic layer 305, it is possible to produce an exchange coupling magnetic field Hex that is equal to or larger than the exchange coupling magnetic field produced when a $Fe_{30}Co_{70}$ single layer is used as the pinned magnetic layer, at the interface with the upper antiferromagnetic layer 304. Furthermore, if the Fe content x of the $Fe_xCo_{100-x}$ layer 352 is set at 60 atomic percent or more and the thickness of the $Fe_xCo_{100-x}$ layer 352 is set at 40% to 60% of the total thickness of the upper pinned magnetic layer 305, it is possible to produce to an exchange coupling magnetic field that is larger than the exchange coupling magnetic field produced when a $Fe_{30}Co_{70}$ single layer is used as the pinned magnetic layer, at the interface with the upper antiferromagnetic layer 304. If a large exchange coupling magnetic field is produced between the upper pinned magnetic layer 305 and the upper antiferromagnetic layer 304 in such a manner, the magnetization of the upper pinned magnetic layer 305 is strongly pinned, thus preventing magnetization reversal of the upper pinned magnetic layer 305.

In the third embodiment described above, by changing the Fe contents x and thickness ratios of the $Fe_xCo_{100-x}$ layers 52 and 352, it is possible to adjust the magnitudes of the exchange coupling magnetic field generated between the lower antiferromagnetic layer 4 and the lower pinned magnetic layer 5 and the exchange coupling magnetic field generated between the upper antiferromagnetic layer 304 and the upper pinned magnetic layer 305 so as to have the maximum values, respectively.

In the third embodiment, in the dual spin-valve magnetic sensing element 301, the exchange-coupled films of the present invention are used for both a combination of the lower antiferromagnetic layer 4 and the lower pinned magnetic layer 5 and a combination of the upper pinned magnetic layer 305 and the upper antiferromagnetic layer 304. However, it is to be understood that the present invention is applicable to at least one of the combination of the lower antiferromagnetic layer 4 and the lower pinned magnetic layer 5 and the combination of the upper pinned magnetic layer 305 and the upper antiferromagnetic layer 304. Furthermore, each of the lower pinned magnetic layer 5 and the upper pinned magnetic layer 305 may have a laminated ferrimagnetic structure including a first magnetic layer, a second magnetic layer, and a nonmagnetic intermediate layer interposed between the first and second magnetic layers. When the laminated ferrimagnetic structure is employed, the present invention is applicable to the antiferromagnetic layer (the lower antiferromagnetic layer 4 or the upper antiferromagnetic layer 304) and the first magnetic layer in contact with the antiferromagnetic layer.

The present invention is also applicable to a tunneling magnetoresistive element (TMR element) utilizing the tunneling effect and a current-perpendicular-to-the-plane (CPP)

type magnetic sensing element in which a sensing current flows perpendicular to the planes of the individual layers constituting the element.

What is claimed is:

1. An exchange-coupled film comprising a ferromagnetic layer and an antiferromagnetic layer disposed on each other, the magnetization direction of the ferromagnetic layer being pinned in one direction by an exchange coupling magnetic field generated at an interface between the ferromagnetic layer and the antiferromagnetic layer, wherein the antiferromagnetic layer comprises $Ir_zMn_{100-z}$ (wherein 2 atomic percent$\leq z \leq$80 atomic percent);

the ferromagnetic layer has a two-layer structure including a $Co_yFe_{100-y}$ layer having a face-centered cubic structure (wherein 80 atomic percent$\leq y \leq$100 atomic percent), the $Co_yFe_{100-y}$ layer being in contact with the antiferromagnetic layer, and an $Fe_xCo_{100-x}$ layer (wherein $x \geq$30 atomic percent), the $Fe_xCo_{100-x}$ layer being disposed on the $Co_yFe_{100-y}$ layer; and the thickness of the $Fe_xCo_{100-x}$ layer is 30% to 90% of the total thickness of the ferromagnetic layer.

2. The exchange-coupled film according to claim 1, wherein the Fe content x in the $Fe_xCo_{100-x}$ layer is 60 atomic percent or more, and the thickness of the $Fe_xCo_{100-x}$ layer is 40% to 60% of the total thickness of the ferromagnetic layer.

3. The exchange-coupled film according to claim 1, wherein the total thickness of the ferromagnetic layer is 1 nm to 2 nm.

4. The exchange-coupled film according to claim 1, wherein the $Fe_xCo_{100-x}$ layer has a thickness of 1 nm or less and has a face-centered cubic structure.

5. The exchange-coupled film according to claim 1, wherein the antiferromagnetic layer has a thickness of 30 Å to 80 Å.

6. The exchange-coupled film according to claim 1, wherein the antiferromagnetic layer comprises $Ir_zMn_{100-z}$ (wherein 10 atomic percent$\leq z \leq$30 atomic percent).

7. A magnetic sensing element comprising a free magnetic layer, a nonmagnetic layer, a pinned magnetic layer, and an antiferromagnetic layer disposed in that order from the bottom, the magnetization of the free magnetic layer being aligned in a direction substantially perpendicular to the magnetization direction of the pinned magnetic layer, wherein the pinned magnetic layer and the antiferromagnetic layer correspond to the exchange-coupled film according to claim 1.

8. A magnetic sensing element comprising an antiferromagnetic layer, a pinned magnetic layer, a nonmagnetic layer, and a free magnetic layer disposed in that order from the bottom, the magnetization of the free magnetic layer being aligned in a direction substantially perpendicular to the magnetization direction of the pinned magnetic layer, wherein the pinned magnetic layer and the antiferromagnetic layer correspond to the exchange-coupled film according to claim 1.

9. The magnetic sensing element according to claim 7, wherein the pinned magnetic layer has a laminated ferrimagnetic structure including a first magnetic layer, a second magnetic layer, and a nonmagnetic intermediate layer interposed between the first and second magnetic layers, and the antiferromagnetic layer and the first magnetic layer in contact with the antiferromagnetic layer correspond to the exchange-coupled film.

10. A magnetic sensing element comprising a lower antiferromagnetic layer, a lower pinned magnetic layer, a lower nonmagnetic layer, a free magnetic layer, an upper nonmagnetic layer, an upper pinned magnetic layer, and an upper antiferromagnetic layer disposed in that order from the bottom, the magnetization direction of the free magnetic layer being aligned in a direction substantially perpendicular to the magnetization directions of the upper pinned magnetic layer and the lower pinned magnetic layer, wherein at least one of a combination of the lower antiferromagnetic layer and the lower pinned magnetic layer and a combination of the upper antiferromagnetic layer and the upper pinned magnetic layer corresponds to the exchange-coupled film according to claim 1.

11. The magnetic sensing element according to claim 10, wherein at least one of the upper pinned magnetic layer and the lower pinned magnetic layer has a laminated ferrimagnetic structure including a first magnetic layer, a second magnetic layer, and a nonmagnetic intermediate layer interposed between the first and second magnetic layers, and the upper antiferromagnetic layer or the lower antiferromagnetic layer and the first magnetic layer in contact with the upper antiferromagnetic layer or the lower antiferromagnetic layer correspond to the exchange-coupled film.

* * * * *